(12) United States Patent
Sano et al.

(10) Patent No.: US 7,702,703 B2
(45) Date of Patent: Apr. 20, 2010

(54) DETERMINATION APPARATUS AND DETERMINATION METHOD

(75) Inventors: Koichi Sano, Shimane (JP); Masayuki Baba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1090 days.

(21) Appl. No.: 11/333,862

(22) Filed: Jan. 17, 2006

(65) Prior Publication Data

US 2007/0078922 A1    Apr. 5, 2007

(30) Foreign Application Priority Data

Sep. 30, 2005    (JP) .............................. 2005-288817

(51) Int. Cl.
*G06F 7/00* (2006.01)
(52) U.S. Cl. .................................................... 708/208
(58) Field of Classification Search ................. 708/208
See application file for complete search history.

(56) References Cited

U.S. PATENT DOCUMENTS

| | | | |
|---|---|---|---|
| 6,687,413 B2* | 2/2004 | Yushiya | 382/262 |
| 6,993,546 B2* | 1/2006 | Nally et al. | 708/313 |
| 6,996,291 B2* | 2/2006 | Nahum | 382/278 |
| 2004/0003016 A1* | 1/2004 | Kitamura | 708/606 |

FOREIGN PATENT DOCUMENTS

| | | |
|---|---|---|
| JP | 2001-184018 | 7/2001 |
| JP | 2004-199536 | 7/2004 |

* cited by examiner

*Primary Examiner*—Tan V Mai
(74) *Attorney, Agent, or Firm*—Greer, Burns & Crain, Ltd.

(57) ABSTRACT

To provide a determination apparatus and a determination method which are capable of determining whether a signal outputted from a testing object is good or not, a Cyclic Redundancy Check (CRC) calculation circuit unit performs calculation on an image signal and a determination circuit unit compares a calculation result obtained by the CRC calculation circuit unit with an expected value stored in an expected value storing unit to determine whether a quality of the image signal is good or not.

15 Claims, 9 Drawing Sheets

DETERMINATION APPARATUS AND DETERMINATION METHOD

BACKGROUND OF THE INVENTION

1. Field of the Invention

The present invention relates to a determination apparatus and a determination method for determining whether the quality of an image signal outputted is good or not.

2. Description of Related Art

Shortening of a manufacturing cycle and a reduction of the manufacturing cost are required for a process for manufacturing an electronic device or the like. Therefore, the cost reduction, quality improvement, and speed-up are also required even for the manufacturing tests of the electronic devices etc.

Up to now, in a manufacturing test process for an electronic device or the like, a display check test for an LCD or the like is performed by visual check by a person. However, the display check performed by the person depends on his/her skills and experiences. Therefore, a check failure or a judgment error may occur in the display check performed by the person. In addition, the display check performed by the person takes a time. Further, the display check performed by the person may cause additional steps.

Therefore, methods eliminating the display check performed by the person have been devised. For example, an apparatus capable of automatically checking an electronic device without a visual check performed by a person in steps of manufacturing and checking the electronic device has been devised (see Patent document 1).

[Patent document 1] JP 2001-184018 A
[Patent document 2] JP 2004-199536 A

In the conventional apparatus eliminating the visual check performed by the person, for example, an LCD display signal is temporarily captured in a high-speed RAM. Then, the conventional apparatus compares a value captured in the high-speed RAM with an expected value stored in advance in a medium-speed RAM. Therefore, the conventional apparatus requires two kinds of RAMs such as one for signal capture and one for expected value storage. Thus, there is a problem in that a cost of the conventional apparatus becomes higher.

Besides, recently, high-resolution LCDs having higher resolutions than XGA have been popularized. Therefore, the conventional apparatus requires a higher-speed and larger-capacity memory. As a result, there is a problem in that the conventional apparatus becomes further costly. In addition, the conventional apparatus has such a structure that the LCD display signal is captured in the memory and then the value of the captured signal is compared with the expected value. Therefore, there is a problem in that the period of time for testing the conventional apparatus becomes long.

Furthermore, the conventional apparatuses use one pixel data of image data as data indicating a display pattern. Therefore, in the conventional apparatus, the pixel used for the display pattern cannot be subjected to the display check test. With respect to this point, according to the description of the conventional apparatus, there is no practical trouble. However, when abnormality occurs in the pixel used for the display pattern, the data of the display pattern does not become the one to be intended. Therefore, there is a fear in that the conventional apparatus erroneously determines a non-defective product to be a defective product.

The present invention has been made in view of the circumstances and an object of the present invention is to provide a determination apparatus and a determination method which are capable of determining whether the quality of a signal outputted from a testing object is good or not.

SUMMARY OF THE INVENTION

In order to solve the above-mentioned problems, a determination apparatus according to the present invention includes: calculation unit performing calculation for reducing an amount of data on an image signal; storage unit storing an expected value to be compared with a calculation result obtained by the calculation means; and determination unit comparing the calculation result obtained by the calculation means with the expected value stored in the storage means to determine whether a quality of the image signal is good or not.

Further, in the determination apparatus according to the present invention, the image signal has a plurality of pixel data for producing respective pixels included in a frame, and the calculation unit may include unit performing arithmetic calculation between the plurality of pixel data to obtain, as the calculation result, numerical data uniquely determined from pixel data composing the frame or a part of the frame.

Further, in the determination apparatus according to the present invention, the calculation performed by the calculation means is calculation using a cyclic redundancy check method.

Further, in the determination apparatus according to the present invention, the storage means may be produced from a field programmable gate array.

Further, a determination method according to the present invention includes: performing calculation for reducing an amount of data on an image signal; and comparing a calculation result obtained by the calculation step with an expected value stored in storage unit storing the expected value to be compared with the calculation result to determine whether a quality of the image signal is good or not.

DETAILED DESCRIPTION OF THE INVENTION

Figure 1:
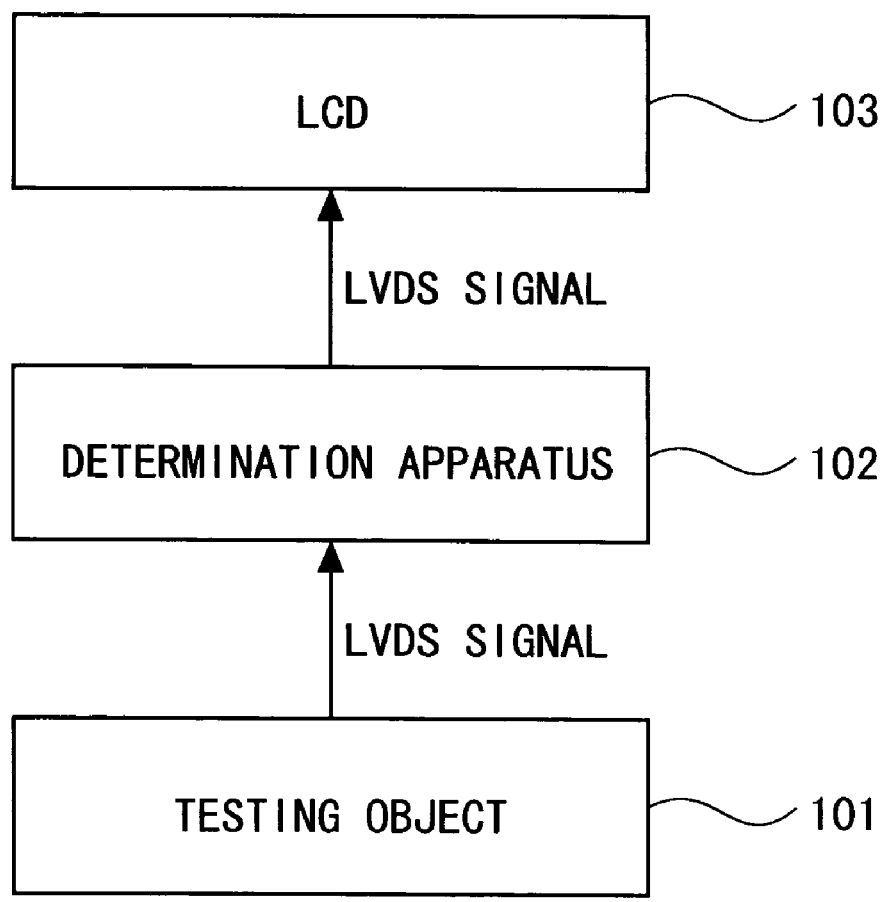
FIG. 1 is a structural diagram showing a determination system using a determination apparatus according to one embodiment of the present invention.

Hereinafter, a best mode for embodying the present invention will be described with reference to the accompanying drawings. A structure in the following embodiment is an example, and thus the present invention is not limited to the structure in the embodiment of the present invention. The description of a determination apparatus according to one embodiment of the present invention, which will be made below, may be used for the description of a determination method according to one embodiment of the present invention. First, by referring FIG. 1, a determination system using the determination apparatus according to one embodiment of the present invention will be described. FIG. 1 is a structural diagram showing the determination system using the determination apparatus according to one embodiment of the present invention.

As shown in FIG. 1, the determination system includes a testing object 101, a determination apparatus 102, and an LCD (liquid crystal display) 103. The testing object 101 is, for example, an LCD driver circuit. The testing object 101 includes a printed circuit board (hereinafter also referred to as PT board) which is not shown. The testing object 101 outputs an LVDS signal which is a signal for driving the LCD 103. The LVDS signal is an abbreviation of low voltage differential signaling. The LVDS signal will be described later.

The determination apparatus 102 is the determination apparatus according to one embodiment of the present invention. The determination apparatus 102 receives the LVDS signal from the testing object 101. The determination apparatus 102 determines whether or not the quality of the received LVDS signal is good or not. The determination operation of the determination apparatus 102 will be described later. Then, the determination apparatus 102 outputs the LVDS signal to the LCD 103. The LCD 103 receives the LVDS signal from the determination apparatus 102. Then, the LCD 103 displays an image based on the received LVDS signal.

Figure 2:
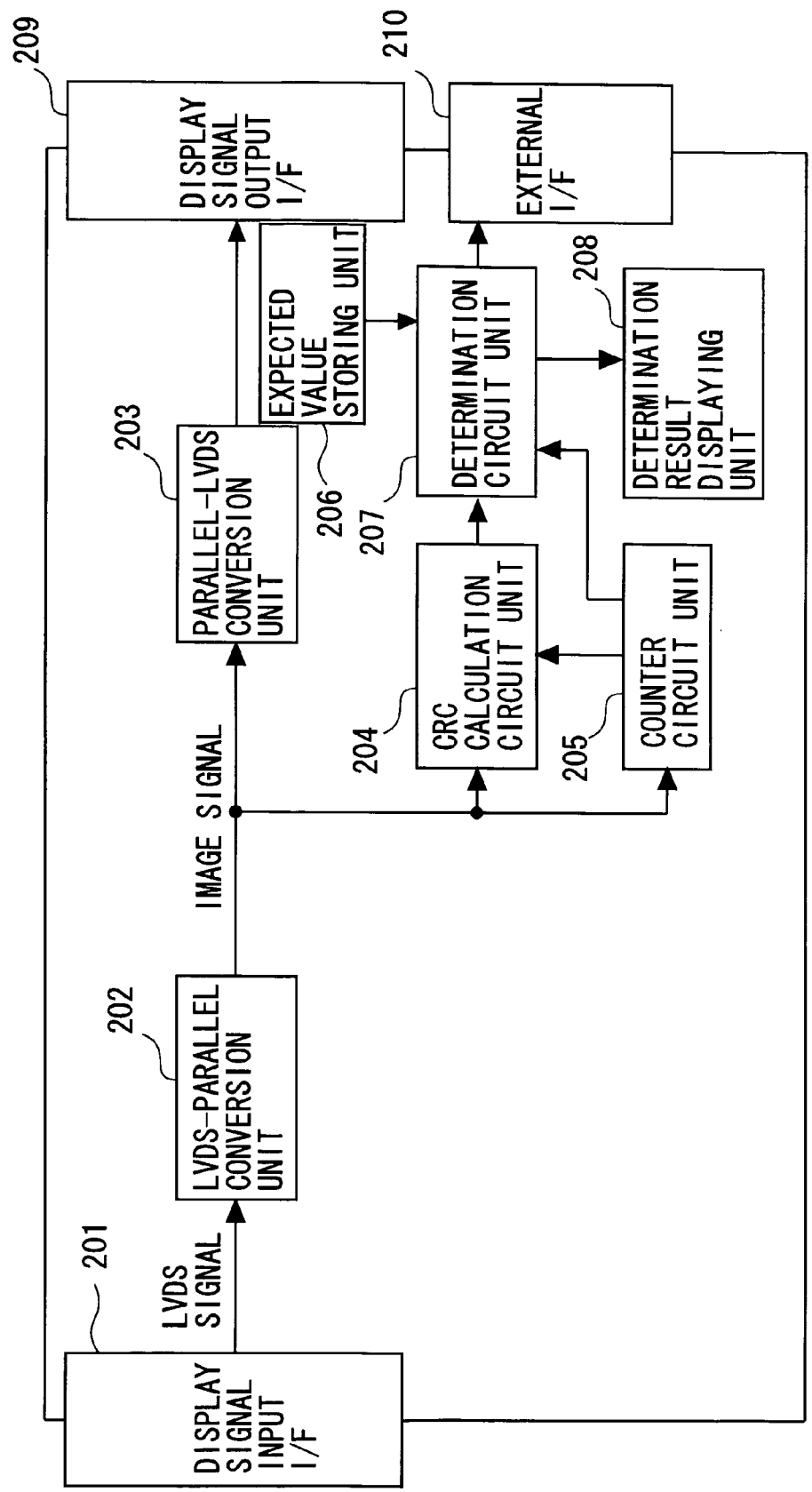
FIG. 2 is a block diagram showing an internal structure of the determination apparatus 102 shown in FIG. 1.

Next, an internal structure of the determination apparatus 102 shown in FIG. 1 will be described with reference to FIG. 2. FIG. 2 is a block diagram showing an internal structure of the determination apparatus 102 shown in FIG. 1. As shown in FIG. 2, the determination apparatus includes a display signal input interface (hereinafter abbreviated as I/F) 201, an LVDS-parallel conversion unit 202, and a parallel-LVDS conversion unit 203. The determination apparatus further includes a cyclic redundancy check (hereinafter abbreviated as CRC) calculation circuit unit 204, a counter circuit unit 205, and an expected value storing unit 206. The determination apparatus further includes a determination circuit unit 207, a determination result displaying unit 208, a display signal output I/F 209, and an external I/F 210. In this case, the CRC means a transmission error detecting method of checking whether or not, for example, data is correctly transmitted during data transmission.

In this embodiment, a field programmable gate array (hereinafter merely abbreviated as FPGA) is used to manufacture the determination apparatus. For example, according to FIG. 2, the CRC calculation circuit unit 204, the counter circuit unit 205, the expected value storing unit 206, and the determination circuit unit 207 are produced from FPGAs. The determination apparatus according to the present invention is not limited to the case where the FPGA is used. For example, an application specific integrated circuit (ASIC) or a CPLD (complex programmable logic device) may be used.

The display signal input I/F 201 becomes an input I/F for the LVDS signal outputted from the testing object. The LVDS signal serving as an LCD display signal, which is outputted from the testing object, is data for a predetermined pattern image. The LVDS signal is generated in an inner portion of the testing object. Then, the LVDS signal inputted to the display signal input I/F 201 is outputted to the LVDS-parallel conversion unit 202.

The LVDS-parallel conversion unit 202 converts the inputted LVDS signal into an image signal. The image signal outputted from the LVDS-parallel conversion unit 202 is outputted to the parallel-LVDS conversion unit 203, the CRC calculation circuit unit 204, and the counter circuit unit 205.

The parallel-LVDS conversion unit 203 converts the inputted image signal into a LVDS signal. Then, the parallel-LVDS conversion unit 203 outputs the LVDS signal to the display signal output I/F 209.

The CRC calculation circuit unit 204 performs CRC calculation on the inputted image signal. Then, the CRC calculation circuit unit 204 outputs a calculation result to the determination circuit unit 207. That is, the CRC calculation circuit unit 204 performs the CRC calculation on the image signal in synchronization with a timing signal. Then, the calculation circuit unit 204 generates a check code corresponding to the calculation result.

The counter circuit unit 205 generates the timing signal used in the CRC calculation circuit unit 204 and the determination circuit unit 207 based on the inputted image signal. That is, the counter circuit unit 205 generates the timing signal based on a vertical synchronizing signal, a data enable signal, and a clock signal which are included in the image signal.

The expected value storing unit 206 stores a CRC calculation result of an image signal whose display result is good as an expected value. Unlike this embodiment, a determination apparatus may be used, in which the expected value storing unit for storing the expected value in advance is not provided. The determination apparatus is connected to the testing object, for outputting a desirable image signal. The determination apparatus performs the CRC calculation on an output from the testing object. A result obtained by the CRC calculation is used for the determination made by the determination apparatus.

The expected value storing unit 206 will be described in more detail. The determination apparatus according to this embodiment also requires an area for storing the expected value. However, in this embodiment, a memory for storing data of the entire frame is not required unlike a conventional technique. For example, in the conventional technique, a memory having a capacity of 2 MB or more is required to store the expected value.

In this embodiment, the CRC calculation is performed on the image data. Then, in this embodiment, as described later, the amount of data of a frame of about 1.8 MB becomes 36 B by the CRC calculation. Although the amount of data is 36 B in this embodiment, there is the case where the amount of data of a check code becomes several tens of bits dependent on the CRC calculation.

As described above, in this embodiment, the CRC calculation circuit is produced using an FPGA element. This element can arbitrarily incorporate circuits. In this embodiment, a circuit for the expected value is incorporated in the element. Therefore, a RAM for storing the expected value is not required in this embodiment. As described above, in this embodiment, not the memory but a switch and the like can be incorporated in a circuit to set the expected value. The expected value set in the FPGA can be selected by a user by changing a switch which is not shown provided in the determination apparatus.

The RAM for storing the expected value may be prepared in the determination apparatus according to the present invention. In the present invention, the expected value is a value obtained after the CRC calculation. Therefore, in this embodiment, a capacity of the memory for storing the expected value may be smaller than that in the conventional cases.

The determination circuit unit 207 compares the calculation result (check code) outputted from the CRC calculation circuit unit 204 with the expected value outputted from the expected value storing unit 206 at a timing of the timing signal outputted from the counter circuit unit 205. Then, the determination circuit unit 207 outputs a determination result indicating whether a quality of the image signal is good or not to the determination result displaying unit 208 and the external I/F 210 based on a result obtained by the comparison. That is, the determination circuit unit 207 compares the check code generated by the CRC calculation circuit unit 204 with the expected value to determine whether the signal quality is good or not. In this embodiment, when at least one bit of the check code is different from that of the expected value, the determination circuit unit 207 determines the image signal to be inappropriate.

The determination result displaying unit 208 displays the determination result outputted from the determination circuit unit 207 in the form so that a user can check the result. In this embodiment, a light emitting diode (hereinafter merely abbreviated as LED) is attached to the determination apparatus. Whether a quality of the image signal is good or not can be checked based on an on/off state of the LED. The determination apparatus according to this embodiment may be connected to a control apparatus, which is not shown, to display, for example, error information on the control apparatus.

The display signal output I/F 209 is an interface for outputting the LVDS signal outputted from the parallel-LVDS conversion unit 203 to the LCD. That is, the display signal output I/F 209 can be connected to the LCD. Therefore, the LVDS signal captured to the determination apparatus is converted into the image signal and then converted into the LVDS signal again. Thus, the signal outputted from the parallel-LVDS conversion unit 203 can also be displayed on the display device such as the LCD.

The external I/F 210 is an interface for outputting the determination result outputted from the determination circuit unit 207 to an outside. Accordingly, the determination result made by the determination circuit 207 can be outputted from the external I/F 210 to the testing object or another apparatus.

Figure 3:
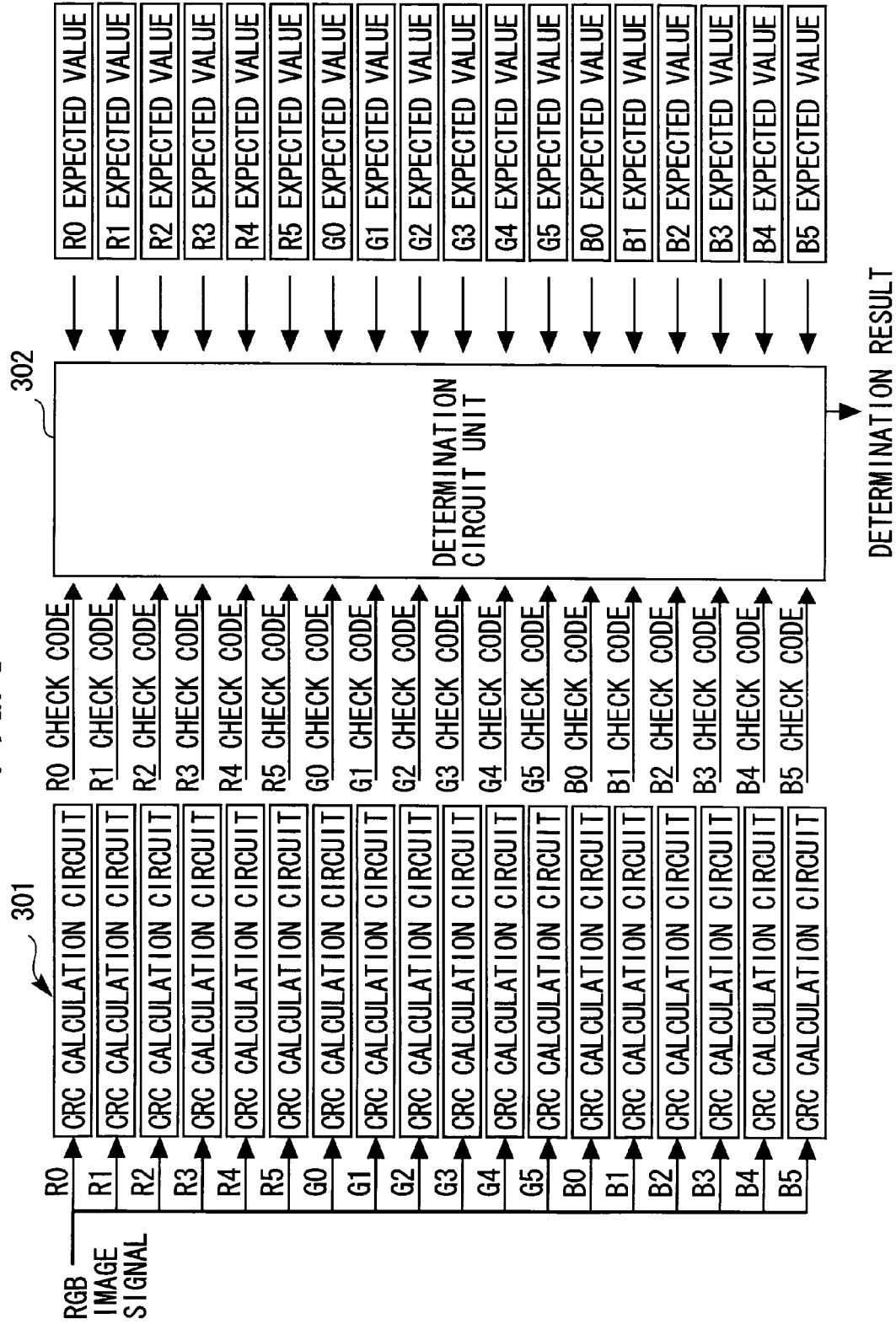
FIG. 3 is a structural block diagram showing a CRC calculation circuit unit 204 and a determination circuit unit 207, which are shown in FIG. 2.

Next, the CRC calculation circuit unit 204 and the determination circuit unit 207, which are shown in FIG. 2, will be described with reference to FIG. 3. FIG. 3 is a structural block diagram showing the CRC calculation circuit unit 204 and the determination circuit unit 207 which are shown in FIG. 2. As shown in FIG. 3, the image signal is an RGB image signal. The RGB image signal is composed of image signals R0 to R5, G0 to G5, and B0 to B5.

The respective image signals are inputted to corresponding CRC calculation circuits 301. As described above, in this embodiment, the CRC calculation circuits 301 are produced from the FPGA. The check codes for respective colors are outputted from the CRC calculation circuits 301. That is, check codes R0 to R5 corresponding to the image signals R0 to R5 are outputted from CRC calculation circuits. Check codes G0 to G5 corresponding to the image signals G0 to G5 are outputted from CRC calculation circuits. Check codes B0 to B5 corresponding to the image signals B0 to B5 are also outputted from CRC calculation circuits. As described later, the number of bits of a check code outputted from one of the CRC calculation circuits shown in FIG. 3 is 16.

The check codes for the respective colors, which are outputted from the CRC calculation circuits, are outputted to the determination circuit unit 302. Expected values corresponding to the respective colors are inputted to the determination circuit unit 302. Then, the determination circuit unit 302 generates a determination result.

As shown in FIG. 3, the CRC calculation circuits 301 perform the CRC calculation processing on the RGB image signal for each bit. Then, the CRC calculation circuits 301 generate the check codes. The determination circuit unit 302 compares the check codes with the expected values. When all the check codes coincide with the expected values, the determination circuit unit 302 determines the input image signals to be good. On the other hand, when any check code does not coincide with a corresponding expected value, the determination circuit unit 302 determines the input image signals to be not good.

Figure 4:
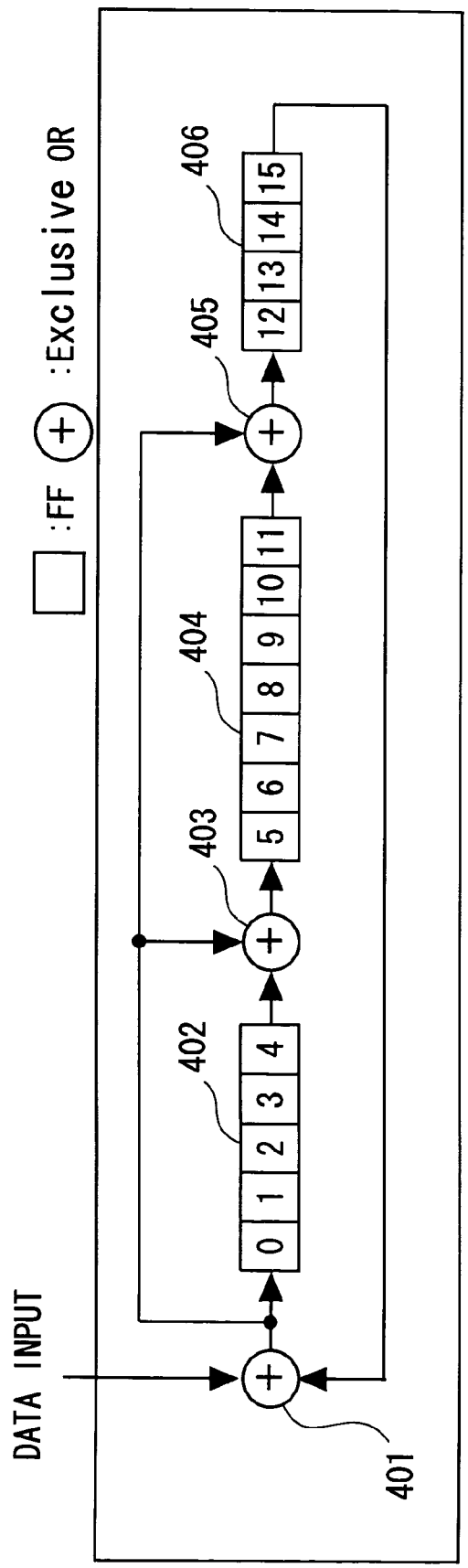
FIG. 4 is a block diagram showing an internal structure of a CRC calculation circuit 301 shown in FIG. 3.

Next, a structure of the CRC calculation circuit 301 shown in FIG. 3 will be described with reference to FIG. 4. FIG. 4 is a block diagram showing an internal structure of the CRC calculation circuit 301 shown in FIG. 3. As shown in FIG. 4, the CRC calculation circuit 301 includes exclusive OR elements 401, 403, and 405. The CRC calculation circuit 301 further includes shift registers 402, 404, and 406, each of which is composed of flip-flops (hereinafter abbreviated as FF).

The shift register 402 includes five FFs connected in series. The shift register 404 includes seven FFs connected in series. The shift register 406 includes four FFs connected in series.

In FIG. 4, inputted data is shifted one bit by one bit through the FFs and the exclusive OR elements as indicated by arrows. After the input of the data is completed, the CRC calculation circuit shown in FIG. 4 takes data from the FFs as a 16-bit check code. As described above, the CRC calculation circuit shown in FIG. 4 is composed of 16 FFs.

As described above, the CRC calculation circuit includes the shift resistor circuits composed of the FFs and the exclusive OR elements. The CRC calculation circuit shown in FIG. 4 generates the 16-bit check code based on CRC-CCITT. The CRC-CCITT is a name of one of CRC calculation expressions, which are international standards. An arrangement among the exclusive OR elements 401, 403, and 405 and the shift registers 402, 404, and 406 composed of the FFs as shown in FIG. 4, expresses a CRC-CCITT expression.

The calculation circuit used in this embodiment is not limited to that shown in FIG. 4 and thus can be changed to a CRC calculation circuit suitable for the purpose of use. In this embodiment, for example, CRC-12 or CRC-32 of CRC calculation expressions, which are determined as the international standards, can be used for the CRC calculation circuit. The CRC-CCITT of the CRC calculation expressions is most orthodox.

Figure 5:
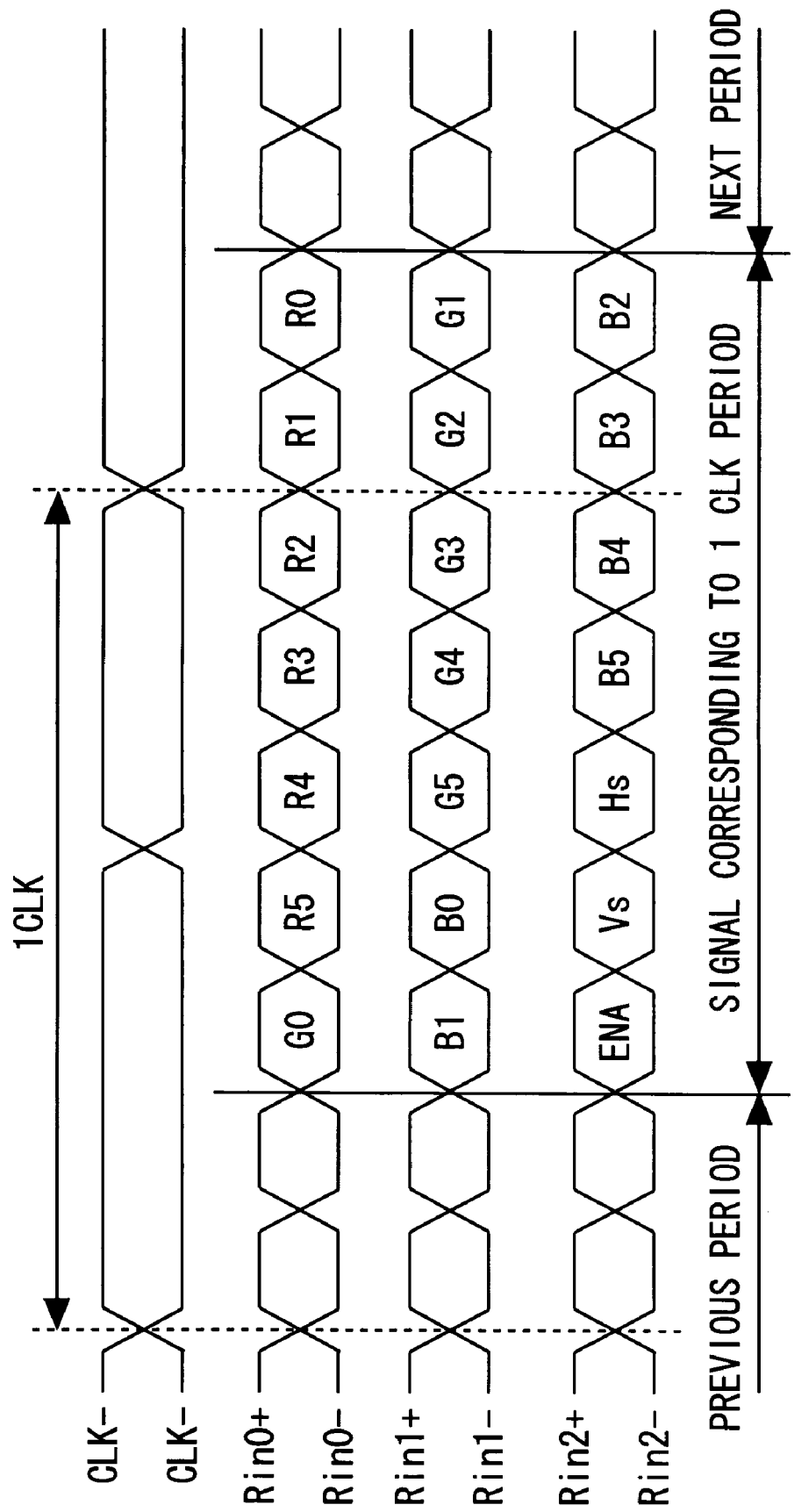
FIG. 5 is a concept diagram showing data mapping of an LVDS signal inputted to the determination apparatus according to one embodiment of the present invention.

Next, the LVDS signal in this embodiment as shown in FIG. 1 will be described with reference to FIG. 5. FIG. 5 is a concept diagram showing data mapping of the LVDS signal inputted to the determination apparatus according to one embodiment of the present invention.

As shown in FIG. 5, the LVDS signal has a clock signal (CLK) and data signals (Rin0, Rin1, and Rin2). The respective data signals include data R0 to R5, G0 to G5, and B0 to B5. One of the data signals includes ENA data, Vs data, and Hs data.

In FIG. 5, Vs denotes a vertical synchronizing signal, Hs denotes a horizontal synchronizing signal, and ENA denotes a data enable signal. The ENA is a control signal indicating a display period corresponding to a lateral line as in the case of HS. The LCD signal is used to control lateral line image display based on the ENA.

The LVDS signal is an abbreviation of low voltage differential signaling. This signal is a differential signal having a small amplitude of about 350 mV. In addition, this signal is a signal used in a system for performing data communication. When the resolution is XGA, a clock frequency of the signal becomes 65 MHz and a bit rate thereof becomes 455 Mbps.

The LVDS signal is a differential signal, so a plus line and a minus line become a pair in this embodiment. In this embodiment, data transfer is performed using two signal lines, the plus line and the minus line. A voltage difference between the two signal lines becomes a signal level. For example, when the voltage difference between the two signal lines is plus, the signal level becomes "H". When the voltage difference between the two signal lines is minus, the signal level becomes "L".

Figure 6:
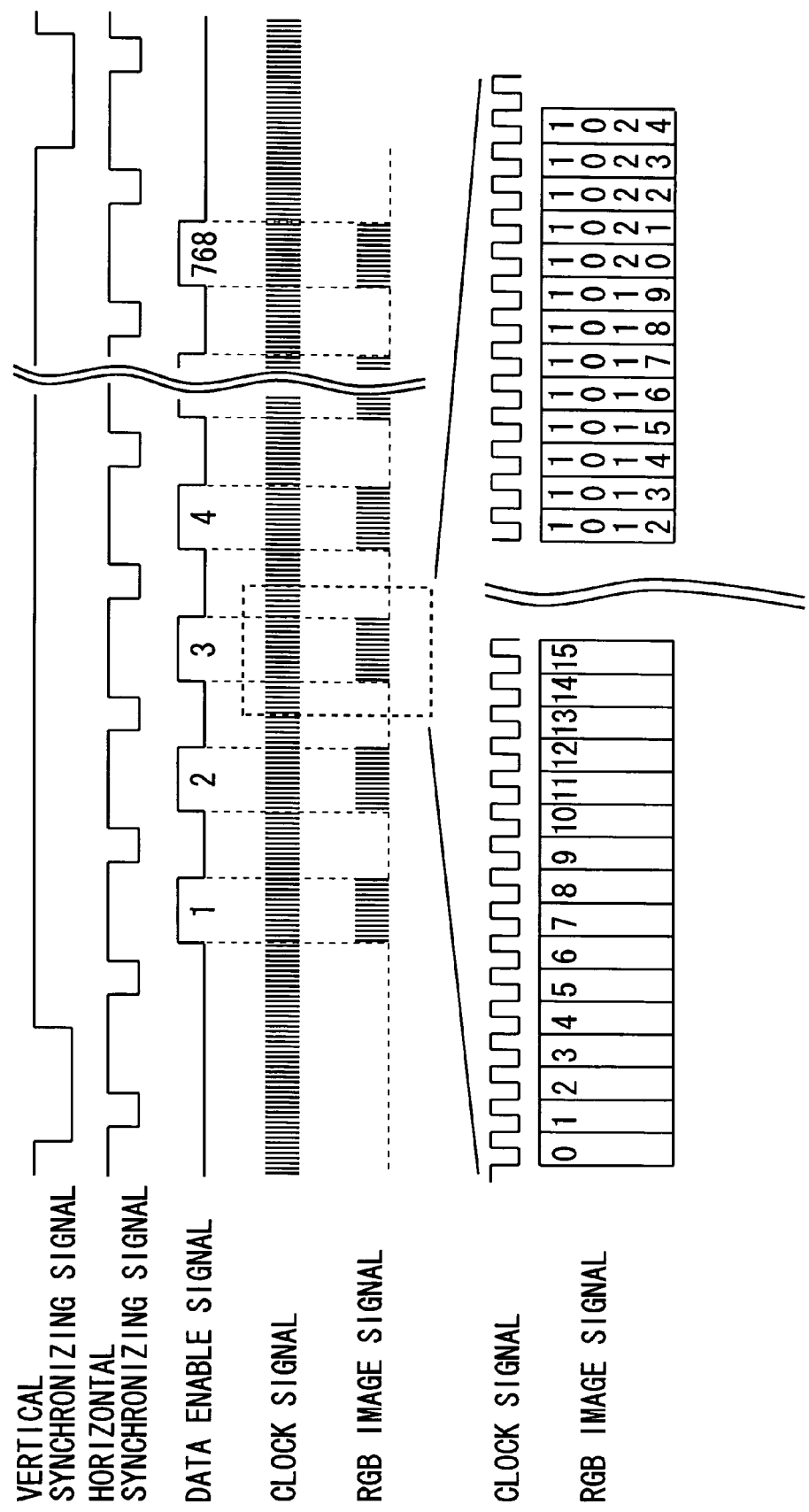
FIG. 6 is a timing chart of an image signal converted by an LVDS-parallel conversion unit 202 shown in FIG. 2.

Next, the image signal converted by the LVDS-parallel conversion unit 202 will be described with reference to FIG. 6. FIG. 6 is a timing chart of the image signal converted by the LVDS-parallel conversion unit 202 shown in FIG. 2.

As shown in FIG. 6, the image signal includes the vertical synchronizing signal, the horizontal synchronizing signal, the data enable signal, the clock signal, and the RGB signal. The RGB signal has three colors of R (red), G (green), and B (blue). Each of the colors of the image signal is expressed by 6 bits. Therefore, each of the colors of the image signal has 64 gray scales. Incidentally, the LCD expresses each color with 256 gray scales using a dithering method. The dithering is a method of displaying the combination of displayable colors in order to express neutral colors in an environment in which the number of usable colors is small.

A rise period of the vertical synchronizing signal corresponds to a display period of a frame. The number of rises of the data enable signal corresponds to the number of lateral scanning lines. Image display data included for the rise period of the data enable signal indicates the number of dots.

FIG. 6 shows an example of a timing chart of XGA. The resolution is 1024×768. In the case of SXGA+, the resolution becomes 1400×1050. In the case of UXGA, the resolution becomes 1600×1200.

Figure 7:
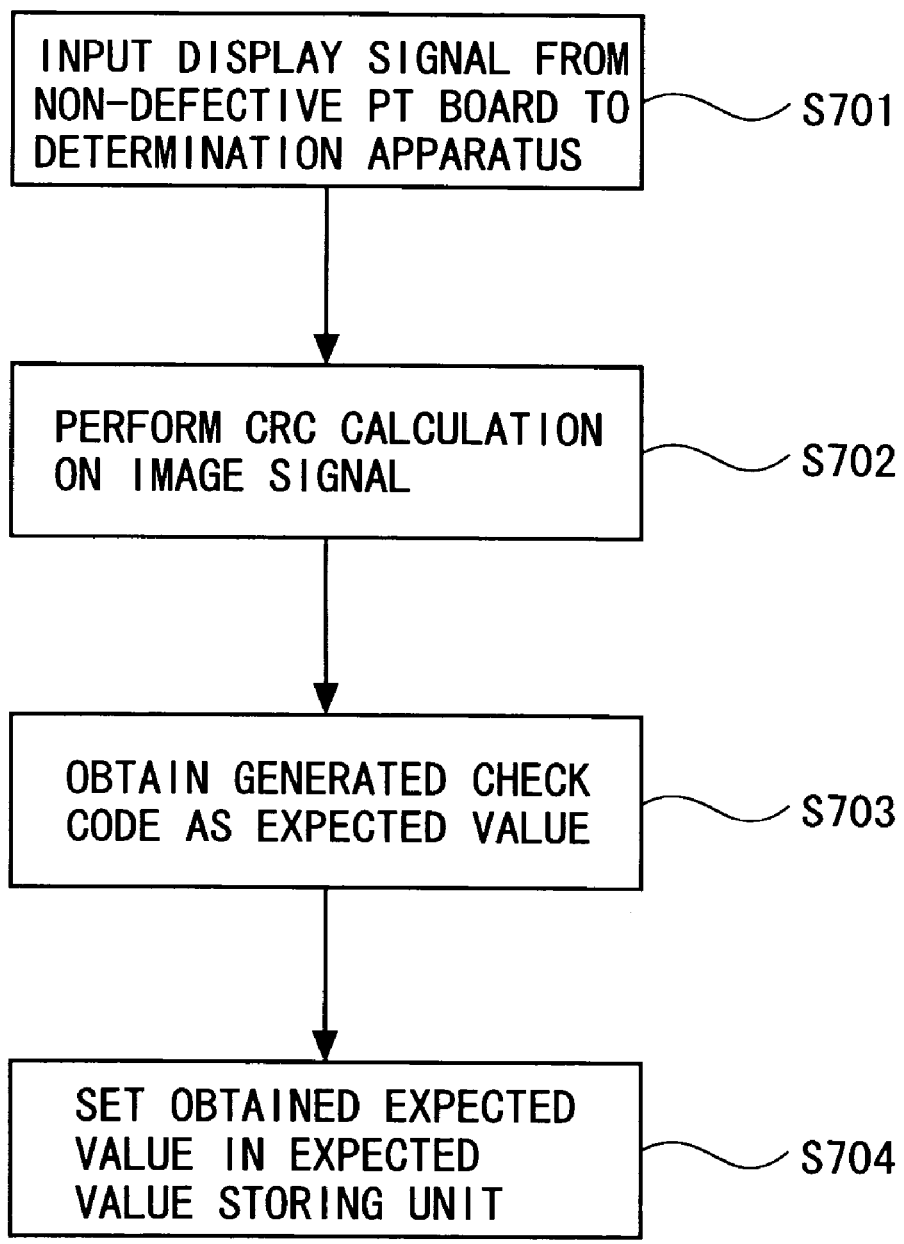
FIG. 7 is a flow chart showing an expected value obtaining operation of the determination apparatus shown in FIG. 1.

Next, the operation of the determination apparatus according to this embodiment as shown in FIG. 1 will be described with reference to FIG. 7. FIG. 7 is a flow chart showing an expected value obtaining operation of the determination apparatus shown in FIG. 1. First, a display signal (LVDS signal) is inputted from a non-defective PT board to the determination apparatus (S701). Here, the non-defective PT board is a PT board, which is verified as a PT board in which a normal image is displayed on the LCD based on an output image signal.

Next, the determination apparatus performs the CRC calculation on the image signal into which the LVDS signal is converted (S702). Then, the determination apparatus obtains the check code generated by the CRC calculation as the expected value (S703). Then, the determination apparatus sets the expected value obtained in Step S703 (S704). Here, setting the expected value means incorporating a circuit for the expected value in the FPGA.

Figure 8:
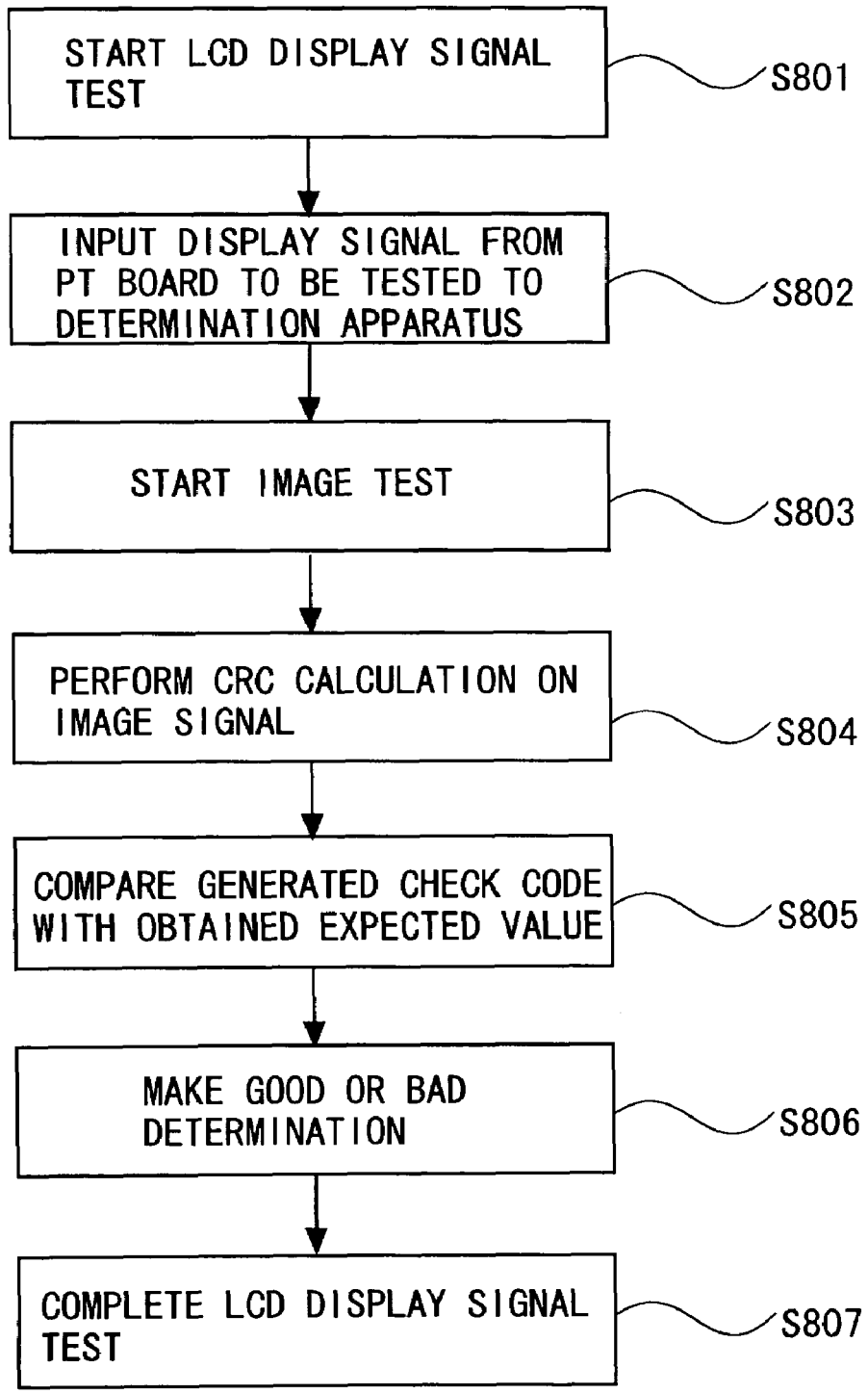
FIG. 8 is a flow chart showing a determination operation of the determination apparatus shown in FIG. 1.

Next, the operation of the determination apparatus according to this embodiment as shown in FIG. 1 will be described with reference to FIG. 8. FIG. 8 is a flow chart showing a determination operation of the determination apparatus shown in FIG. 1. First, when an LCD display signal test starts (S801), a display signal is inputted from a PT board to be tested to the determination apparatus (S802).

In Step S803, the determination apparatus starts an image test. The image test is a test for determining whether the display signal from the testing object is normal or not. More specifically, a power source voltage test, a check of various signals, and a frequency check of various signals are performed.

In Step S804, the determination apparatus performs the CRC calculation on the image signal. Then, the determination apparatus compares the check code generated by the CRC calculation performed in Step S804 with the stored expected value (S805).

Then, the determination apparatus makes the determination whether the quality of the signal is good or not based on a result obtained by the comparison performed in S805 (S806).

On the other hand, when a determination result in the determination made in S806 is good, the determination apparatus ends the LCD display signal test (S807).

As described above, the determination apparatus according to one embodiment of the present invention performs the CRC calculation on the inputted image signal corresponding to a frame. Then, the determination apparatus according to one embodiment of the present invention compares the check code of the image signal subjected to the CRC calculation with the expected value. Therefore, the determination apparatus according to one embodiment of the present invention requires no RAM for storing the entire image signal, thereby being capable of attaining the cost reduction.

In other words, in the conventional cases, because the image signal is not subjected to the CRC calculation, the amount of data becomes 2 MB or more, with the result that the expected value cannot be set in the FPGA. Therefore, a circuit using the FPGA cannot be realized, so a high-speed and large-capacity RAM is required.

However, the determination apparatus according to one embodiment of the present invention performs the CRC calculation on the image signal. Therefore, according to this embodiment, the amount of data of the result obtained by calculation can be compressed, so it is possible to set the expected value for the image signal in the FPGA in this embodiment. Thus, the determination apparatus according to one embodiment of the present invention does not require a memory such as a writing RAM or a RAM for storing the expected value.

Further, in the determination apparatus according to one embodiment of the present invention, the CRC calculation circuit, the expected value storing unit, and the determination circuit unit are produced using the FPGAs. Therefore, the check code, which is the result obtained by calculation, can be compared with the expected value in real time, thereby being a capable of shortening a determination time.

Further, in the determination apparatus according to one embodiment of the present invention, the data of the image signal and the expected value are not stored in RAMs, so it is unnecessary to perform comparison between the memories. As a result, a high-speed test can be realized. In addition, in the determination apparatus according to one embodiment of the present invention, no RAM is used, so it is unnecessary to provide an address generating circuit for generating a readout timing and a write timing.

Further, in the determination apparatus according to one embodiment of the present invention, the FPGAs are used, so the resolution can be flexibly changed. That is, in the determination apparatus according to one embodiment of the present invention, a step such as the addition of a memory may be eliminated.

Further, according to the determination apparatus in one embodiment of the present invention, it is possible to display an image based on the image signal, which has been subjected to test. Therefore, according to the determination apparatus in the embodiment of the present invention, a test frame and a trouble state can be visually checked. Therefore, the determination apparatus in the embodiment of the present invention can also be utilized for trouble analysis.

Further, in the determination apparatus according to one embodiment of the present invention, an address is not embedded in a display pattern, so erroneous determination can be reduced. That is, in the determination apparatus according to one embodiment of the present invention, data corresponding to a pixel of the image data, is not used as data indicating the display pattern. Therefore, in the determination apparatus according to one embodiment of the present invention, there is no case where erroneous determination in which a non-defective product is determined to be a defective product is made as in the conventional apparatuses.

Further, the determination apparatus according to one embodiment of the present invention makes the determination using the CRC calculation. Therefore, unlike the case where, for example, a check sum method is used, even when a burst error is caused, the determination apparatus according to one embodiment of the present invention can correctly determine whether the quality of the signal is good or not.

Further, the determination apparatus according to one embodiment of the present invention makes the determination using the CRC calculation. Elements for executing the CRC calculation can performs the calculation at an internal rate which is a rate of up to about 500 MHz, though it depends on the characteristics of the respective elements. Therefore, the determination apparatus according to one embodiment of the present invention can perform high-speed determination processing.

Note that, in the determination apparatus according to one embodiment of the present invention, the CRC calculation is used as the calculation on the image signal. However, the determination apparatus according to the present invention is not limited to the case of the CRC calculation. For example, instead of the CRC calculation, a hash value may be obtained from the image signal.

Figure 9:
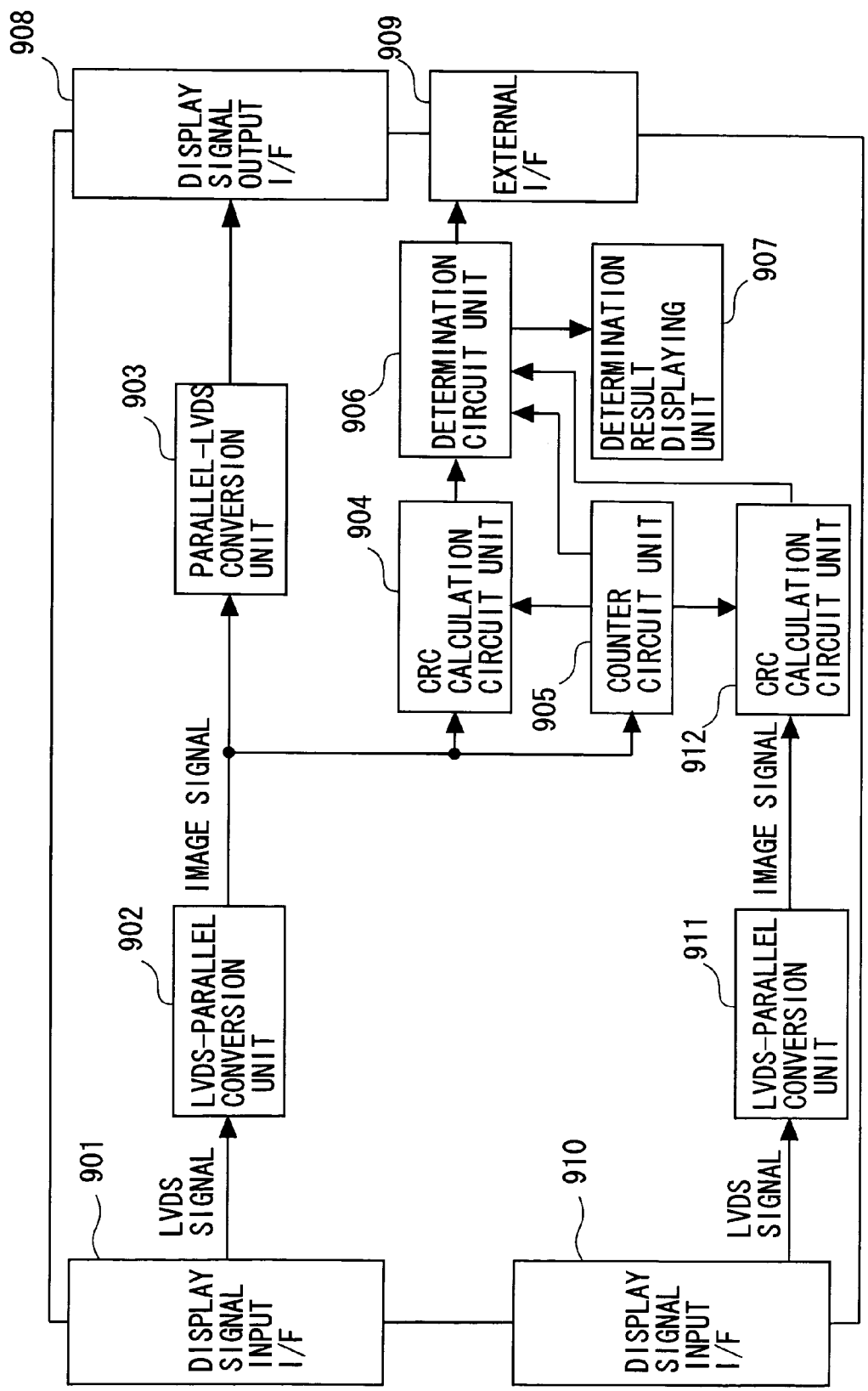
FIG. 9 is a block diagram showing a modified example of the determination apparatus according to one embodiment of the present invention.

Further, the determination apparatus according to one embodiment of the present invention, the expected value for the non-defective product is obtained in advance. However, the image signal from the testing object and the image signal from the non-defective product may be simultaneously inputted to a determination apparatus and the two image signals may be compared with each other to make the determination. In this case, it is unnecessary to obtain the expected value for the non-defective product in advance. Such a determination apparatus will be described with reference to FIG. 9. FIG. 9 is a block diagram showing a modified example of the determination apparatus according to one embodiment of the present invention.

In FIG. 9, the display signal input I/F 901, the LVDS-parallel conversion unit 902, the parallel-LVDS conversion unit 903, the CRC calculation circuit unit 904, the determination result displaying unit 907, the display signal output I/F 908, and the external I/F 909 are operated as in the corresponding members shown in FIG. 2. Therefore, the detailed descriptions thereof are omitted here.

A counter circuit unit 905 outputs a timing signal to the CRC calculation circuit unit 904 and the CRC calculation circuit unit 912. A determination circuit unit 906 receives check codes from the CRC calculation circuit unit 904 and the CRC calculation circuit unit 912. Then, the determination circuit unit 906 determines whether or not the received two check codes coincide with each other.

A normal LVDS signal is inputted to a display signal input I/F 910. The LVDS signal is inputted to an LVDS-parallel conversion unit 911. The LVDS-parallel conversion unit 911 converts the inputted LVDS signal into an image signal. The image signal is inputted to the CRC calculation circuit unit 912. The CRC calculation circuit unit 912 performs the CRC calculation on the inputted image signal in response to the timing signal from the counter circuit unit 905 to generate the check code. The check code is inputted to the determination circuit unit 906. When the inputted two check codes coincide with each other, the determination circuit unit 906 determines the image signal inputted to the display signal input I/F 901 to be normal. When the two check codes do not coincide with each other, the image signal inputted to the display signal input I/F 901 is determined to be abnormal. Therefore, according to the determination apparatus shown in FIG. 9, the memory for storing the expected value can be eliminated, thereby being capable of reducing the cost for the determination apparatus.

As described above, according to the present invention, the calculation is performed for reducing the amount of data on the image signal. Then, in the present invention, the calculation result is compared with the expected value. Then, a quality of the image signal is good or not is determined in the present invention. Therefore, according to the present invention, it is possible to automatically determine whether a quality of the image signal is good or not. In addition, according to the present invention, the amount of data of the calculation result can be reduced as compared with the amount of data of the image signal. Therefore, in the present invention, it is possible to reduce a capacity of the storing unit for storing the expected value. Further, in the present invention, it is unnecessary to embed a display pattern in the image signal. As a result, according to the present invention, erroneous determination can be reduced as to whether a quality of the image signal is good or not.

In the present invention, the calculation using a cyclic redundancy check method is performed on the image signal. Therefore, according to the present invention, it is possible to perform high-speed calculation processing by using the CRC calculation method.

In the present invention, the expected value is stored in the storage means produced from the field programmable gate array. Therefore, a RAM for storing the expected value is not required in the present invention. According to the present invention, the calculation result and the expected value can be compared with each other in real time, thereby being capable of shortening a determination time. Further, in the present invention, it is unnecessary to provide an address generating circuit for generating readout timing and write timing. Further, the present invention can be flexibly applied to the case where the resolution of the image is changed.

The disclosures of Japanese patent application No. JP2005-288817 filed on Sep. 30, 2005 including the specification, drawings and abstract are incorporated herein by reference.

What is claimed is:

1. A determination apparatus, comprising:
    a calculation unit performing first calculation for reducing an amount of data on an input signal related to a display from a testing object; and
    a determination unit to compare a first calculation result obtained by the calculation unit with an expected value, which is a result of second calculation for reducing an amount of data on a normal signal, the data on the normal signal being related to a display and being the same as the data related to the display of the input signal, and to determine whether a quality of the input signal is normal or not.

2. The determination apparatus according to claim 1, in which the input signal has a plurality of pixel data for producing respective pixels included in a frame and the calculation unit includes a unit performing arithmetic calculation between the plurality of pixel data to obtain, as the first calculation result, numerical data uniquely determined from pixel data composing the frame or a part of the frame.

3. The determination apparatus according to claim 1, in which the calculation unit performs error detection for reducing the amount of data.

4. The determination apparatus according to claim 1, in which the first calculation performed by the calculation unit is calculation using a cyclic redundancy check method.

5. The determination apparatus according to claim 1, further comprising a storage unit to store the expected value and to be produced from a field programmable gate array.

6. A determination apparatus according to claim 1, wherein the calculation unit includes a conversion unit that converts a signal with a low voltage differential signaling format as the input signal to an image signal.

7. A determination apparatus according to claim 6, wherein the image signal includes a vertical synchronizing signal, a horizontal synchronizing signal, a data enable signal, a clock signal and RGB (Red Green Blue) signal.

8. A determination apparatus according to claim 7, wherein the calculation unit includes a counter circuit that generates a timing signal using the vertical synchronizing signal, the data enable signal and the clock signal, the calculation unit comparing the result calculated by the calculation unit with the expected value based on the timing signal generated by counter circuit.

9. A determination apparatus, comprising:
a first calculation unit to perform calculation for reducing an amount of data on an input signal related to a display from a testing object;
a second calculation unit to perform the same calculation as the first calculation unit for reducing an amount of data on a normal signal, the data on the normal signal being related to a display and being the same as the data on the input signal from the testing object; and
a determination unit to compare a calculation result obtained by the first calculation unit with a calculation result obtained by the second calculation unit, and to determine whether a quality of the input signal from the testing object is normal or not.

10. A determination method in an apparatus for determining quality of signals, comprising:
performing first calculation for reducing an amount of data on an input signal related to a display from a testing object; and
comparing a first calculation result obtained by the performing step with an expected value resulting from second calculation for reducing an amount of data on a normal signal related to a display, the data on the normal signal being related to a display and is the same as the data on the input signal, to determine whether a quality of the input signal is normal.

11. A determination method according to claim 10, in which the input signal has a plurality of pixel data for producing respective pixels included in a frame, and
the comparing step includes performing arithmetic calculation between the plurality of pixel data to obtain, as the first calculation result, numerical data uniquely determined from pixel data composing the frame or a part of the frame.

12. A determination method according to claim 10, in which the comparing step includes performing error detection for reducing the amount of data.

13. A determination method according to claim 10, in which the calculation performed by the comparing step is calculation using a cyclic redundancy check method.

14. A determination method according to claim 10, in which the storage unit is produced from a field programmable gate array.

15. A determination method in an apparatus for determining quality of signals, comprising:
performing first calculation for reducing an amount of data on an input signal related to a display from a testing object;
performing second calculation for reducing an amount of data on a normal signal related to a display, the data on the normal signal being the same as the data on the input signal; and
comparing a first calculation result obtained by the first calculation performing step with a second calculation result obtained by the second calculation performing step to determine whether a quality of the image signal from the testing object is normal.

* * * * *